Patented June 1, 1943

2,320,630

UNITED STATES PATENT OFFICE 2,320,630

TAENIACIDE

Orley J. Mayfield and Jack P. Henry, Charles City, Iowa, assignors to Dr. Salsbury's Laboratories No Drawing. Application January 29, 1941, Serial No. 376,540

5 Claims. (Cl. 167—53.1)

This application is a continuation-in-part of our application Ser. No. 129,080, filed March 4, 1937, now Patent No. 2,245,530, for an improved taeniacide for poultry, but it is not restricted to poultry, being adaptable to all forms of higher animal life.

This invention relates to medicine for internal consumption, particularly intended for poultry, birds and animals for expelling strobila and other worms, including the scolex and proglothides, without injuring the subjects.

The invention comprises certain organic drugs or chemicals combined with inert ingredients and pressed in tablet form for convenience in use, but is not restricted to this special form of preparation.

We have found that certain alkaloids which have a quaternary linkage may be combined with areca nut to form a taeniacide for poultry. Alkaloids having such anthelmintic properties include muscarine, strychnine and strychnine derivatives, curare, or any similar alkaloid which contains one or more nitrogen atoms and exists in its natural form as a quaternary compound or can be converted into quaternary compounds by chemical methods. In most cases the toxicity of the pure alkaloid has been greatly reduced by the conversion of the tertiary nitrogen over to a quaternary nitrogen.

We have found that these quaternary nitrogen containing compounds when pressed into a pellet form together with a laxative such as areca nut are readily administered and are effective as poultry taeniacides without harmful after effects.

The relative effectiveness of certain natural and synthetic organic compounds containing nitrogen in quaternary form are indicated by the following examples.

Example 1

Curare extract, which is a natural existing quaternary alkaloid when administered to birds, gives the following results:

(a) White Leghorn No. 716, which was suffering from a tapeworm infestation was administered a gelatine capsule containing 30 mg. of curare extract and 500 mg. of finely ground areca nut. Within a few hours following the administration of this drug, this bird passed 7 Raillietina tetragona. This bird was killed and examined nineteen days later, and 5 Raillietina tetragona were found on post-mortem.

(b) Buff Wyandotte 905, which was suffering from a tapeworm infestation was administered a gelatin capsule containing 25 mg. of curare extract and 500 mg. of finely ground areca nut. Within a few hours following the administration of this drug 12 Raillietina tetragona were passed and 3 Raillietina echinobothrida. Post-mortem on this bird revealed 3 Raillietina tetragona remaining in the bird.

(c) Rhode Island Red hen No. 3194, which was suffering from a heavy infestation of tapeworms, was given 500 mg. of powdered cuarare bark mixed together with 500 mg. of finely ground areca nut in a gelatin capsule. A few hours following the administration of this combination 34 Raillietina tetragona were passed. This bird was killed twenty days later and no tapeworms were found when a careful examination was made.

Example 2

Muscarine, which is a natural existing quaternary ammonium compound is found effective in the removal of Raillietina tetragona and Raillietina echinobothrida.

(a) White Rock hen No. 985 was given 10 mgs. of muscarine mixed with 500 mgs. of finely ground areca nut and placed in a gelatin capsule. Within a few hours following the administration of this capsule the bird passed 9 Raillietina tetragona.

(b) Buff Rock hen No. 953 was given 20 mgs. of muscarine mixed with 500 mgs. of finely ground areca nut and placed in a gelatin capsule. Within a few hours following the administration of this capsule, this bird passed 2 Raillietina tetragona and 3 Raillietina echinobothrida.

Example 3

Methyl strychnine hydrochloride, which is the quaternary form of strychnine, when administered to birds, gives the following results.

(a) White Rock hen No. 3105 was given 25 mgs. of methyl strychnine hydrochloride together with 500 mg. of finely ground areca nut in a gelatin capsule. Within a few hours following the administration of this capsule, 1 Raillietina tetragona was passed. This bird was killed seven days later and no tapeworms were found on postmortem.

(b) Buff Rock adult hen No. 905 was given 25 mgs. of methyl strychnine hydrochloride mixed with 500 mgs. of finely ground areca nut and placed in a gelatin capsule. Within a few hours following the administration of this capsule, this bird passed 12 Raillietina tetragona and 3 Raillietina echinobothrida. This bird was killed later and a thorough examination of the intestinal tract revealed the presence of 3 *Raillietina tetragona*.

(c) White Rock hen No. 902 was given 50 mgs. of methyl strychnine hydrochloride mixed with 500 mgs. of finely ground areca nut and placed in a gelatin capsule. Within a few hours following the administration of this capsule, this bird passed 9 *Raillietina tetragona*. No post mortem was made following the administration of this drug.

(d) White Rock hen No. 958 was given 50 mgs. of methyl strychnine hydrochloride mixed with 500 mgs. of finely ground areca nut and placed in a gelatin capsule. Within a few hours following the administration of this capsule, this bird passed 3 *Raillietina teragona*. This bird was killed and a thorough examination of the intestinal tract revealed the presence of no tapeworms.

Although the examples given of the invention relate to poultry, this word is used generally to include all domestic and wild fowl, birds, and small mammals.

We claim the following as our invention:

1. An internal remedy for poultry and creatures subject to worms comprising a strychnine derivative having nitrogen in quaternary form and areca nut.

2. An internal remedy for poultry and creatures subject to worms comprising curare and areca nut.

3. An internal remedy for poultry and creatures subject to worms comprising muscarine and areca nut.

4. A taeniacide containing areca nut and comprising as the essential active ingredient a quaternary nitrogen containing organic compound of the alkaloid group consisting of strychnine derivatives, muscarine and curare.

5. An internal remedy for poultry and creatures subject to worms comprising methyl strychnine hydrochloride and areca nut.

ORLEY J. MAYFIELD.
JACK P. HENRY.